(12) United States Patent
Prouty et al.

(10) Patent No.: US 9,019,279 B1
(45) Date of Patent: *Apr. 28, 2015

(54) SYSTEMS AND METHOD FOR NAVIGATING BETWEEN A NADIR VIEW AND AN OBLIQUE VIEW OF A MAP

(75) Inventors: Jeffrey Thomas Prouty, Seattle, WA (US); Steven Maxwell Seitz, Seattle, WA (US); Carlos Hernandez Esteban, Kirkland, WA (US); Matthew Robert Simpson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 438 days.

This patent is subject to a terminal disclaimer.

(21) Appl. No.: 13/426,511

(22) Filed: Mar. 21, 2012

Related U.S. Application Data

(60) Provisional application No. 61/543,273, filed on Oct. 4, 2011.

(51) Int. Cl.
*G06T 13/00* (2011.01)
*G06T 15/20* (2011.01)

(52) U.S. Cl.
CPC .................................. *G06T 15/205* (2013.01)

(58) Field of Classification Search
CPC ................ G06F 3/04815; G06T 13/00; G06T 13/20–13/60; G06T 19/00–19/003
USPC ....................................................... 345/475
See application file for complete search history.

(56) References Cited

U.S. PATENT DOCUMENTS

| 5,276,785 | A | 1/1994 | Mackinlay et al. | |
|---|---|---|---|---|
| 6,487,304 | B1 * | 11/2002 | Szeliski | 382/107 |
| 7,831,089 | B2 * | 11/2010 | Ofek et al. | 382/154 |
| 2004/0085335 | A1 * | 5/2004 | Burlnyk et al. | 345/716 |
| 2009/0259976 | A1 | 10/2009 | Varadhan et al. | |
| 2011/0310087 | A1 * | 12/2011 | Wright et al. | 345/419 |

* cited by examiner

*Primary Examiner* — Charles Tseng
(74) *Attorney, Agent, or Firm* — Lerner, David, Littenberg, Krumholz & Mentlik, LLP (57) ABSTRACT

System and method for rendering a sequence of orthographic approximation images corresponding to camera poses to generate an animation moving between an initial view and a final view of a target area are provided. An initial image corresponding to an initial camera pose directed at the target area is identified. A final image and an associated depthmap corresponding to a final camera pose directed at the target area is further identified. A plurality of intermediate images corresponding to a plurality of camera poses directed at the target area is produced by performing interpolation on the initial image, the final image, and the associated depthmap. Each intermediate image is associated with a point along a navigational path between the initial camera pose and the final camera pose. An animation of the plurality of intermediate images produces a transition of views between the initial camera pose and the final camera pose.

18 Claims, 8 Drawing Sheets

SYSTEMS AND METHOD FOR NAVIGATING BETWEEN A NADIR VIEW AND AN OBLIQUE VIEW OF A MAP

CROSS-REFERENCE TO RELATED APPLICATIONS

The present application claims the benefit of U.S. Provisional Patent Application Ser. No. 61/543,273, entitled "Systems and Method for Navigating from a Nadir View to an Oblique View of a Map," filed on Oct. 4, 2011, which is hereby incorporated by reference in its entirety for all purposes.

FIELD

The subject technology generally relates to an animated change in map imagery and its associated view orientations and, in particular, relates to systems and methods for rendering a sequence of orthographic approximation images corresponding to camera poses to generate the animation in mapping applications.

BACKGROUND

Mapping applications may provide both nadir view images (i.e., satellite images) and oblique aerial view images of points of interest. As a user views a nadir view image of a target area, the user may interface with the mapping application through a user command (e.g., a mouse click, a keystroke, etc.) to select and view an oblique aerial view image of the target area. Upon selection of the oblique aerial view, the mapping application transitions from the nadir view to the oblique aerial view. However, transitioning between the nadir view and the oblique aerial view in a single frame may create a jarring and unpleasant user experience, and may cause a user to lose spatial context of the map viewed.

SUMMARY

The disclosed subject matter relates to a machine-implemented method for rendering a sequence of orthographic approximation images corresponding to camera poses to generate an animation moving between an initial view and a final view of a target area is provided. An initial image corresponding to an initial camera pose directed at the target area is identified. A final image and an associated depthmap corresponding to a final camera pose directed at the target area is further identified. A plurality of intermediate images corresponding to a plurality of camera poses directed at the target area is produced by performing interpolation on the initial image, the final image, and the associated depthmap. Each intermediate image is associated with a point along a navigational path between the initial camera pose and the final camera pose. An animation of the plurality of intermediate images produces a transition of views between the initial camera pose and the final camera pose.

According to various aspects of the subject technology, a system comprising one or more processors and a machine-readable medium comprising instructions stored therein, which when executed by the processors, cause the processors to render a sequence of orthographic approximation images is provided. A satellite view image corresponding to an initial camera pose directed at the target area is received. Furthermore, an oblique view image and an associated depthmap corresponding to a final camera pose directed at the target area are received. A plurality of intermediate images corresponding to a plurality of intermediate camera poses directed at the target area are produced by performing interpolation on the satellite view image, the oblique view image, and the depthmap associated with the oblique view image. Each of the plurality of camera poses represents a viewing angle along a navigational path between a viewing angle associated with the initial camera pose and a viewing angle associated with the final camera pose. An animation of the plurality of intermediate images produces a transition of views between the initial camera pose and the final camera pose.

The disclosed subject matter also relates to a machine-readable medium comprising instructions stored therein, which when executed by a system, cause the system to perform operations comprising rendering a sequence of orthographic approximation images corresponding to camera poses. A satellite view image is received as an initial camera pose of a target location and rendered into a screen buffer, and a final oblique view image is received as a final camera pose of the target location. A depthmap associated with the final oblique view is also received. The depthmap includes several pixels, and each pixel includes a depth value. Several intermediate images corresponding to several of intermediate camera poses of the target area are produced. A height scaled mesh model is rendered for each of the several intermediate images based on an interpolation performed on the final oblique view image and the depthmap associated with the final oblique view image. Each of the several intermediate images corresponds to an intermediate camera pose of a specific angle. The interpolation is further performed on the several height scaled mesh models produced and the satellite image rendered into the screen buffer.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art, that the subject technology may be practiced without some of these specific details. In other instances, well-known structures and techniques have not been shown in detail so as not to obscure the subject technology.

According to various aspects of the subject technology, a method for rendering a sequence of orthographic approximation images corresponding to camera poses to generate an animation moving between a nadir view image and an associated oblique view image of a target area is provided. An initial image corresponding to an initial camera pose directed at the target area is identified. A final image and an associated depthmap corresponding to a final camera pose directed at the target area is further identified. A plurality of intermediate images corresponding to a plurality of camera poses directed at the target area is produced by performing interpolation on the initial image, the final image, and the associated depthmap. Each intermediate image is associated with a point along a navigational path between the initial camera pose and the final camera pose. An animation of the plurality of intermediate images produces a transition of views between the initial camera pose and the final camera pose.

Figure 1:
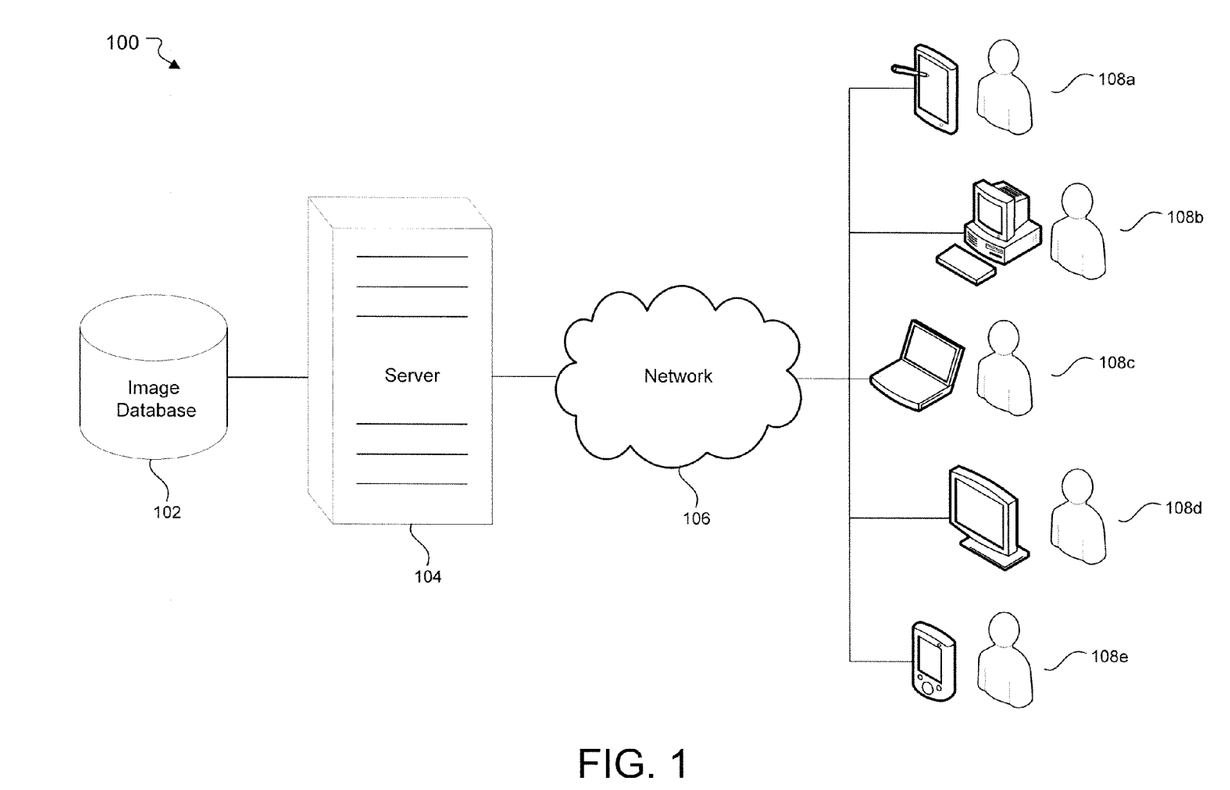
FIG. 1 illustrates an example of a system for serving/retrieving image data utilized to generate animations that represent transitions between different viewing orientations, in accordance with various aspects of the subject technology.

Network environment 100 comprises one or more databases 102 (e.g., computer-readable storage devices) for storing a plurality of images associated with a plurality of target areas, and for storing a plurality of depthmaps corresponding to certain images. The stored images may include images corresponding to a variety of different elevation orientations (e.g., nadir view, oblique aerial view, street view etc.) and a variety of different directional headings. The stored depthmaps may be associated with images to provide renderings of different viewing orientations (e.g., oblique aerial view images, street view images, etc.).

The network environment 100 further comprises one or more servers 104. Server 104 may receive requests from user-operated client devices 108a-108e. Server 104 and client devices 108a-108e may be communicatively coupled through a network 106. Client devices 108a-108e may request data from server 104. Upon receiving the request, server 104 may retrieve a set of associated images and depthmaps from image database 102 and serve the set of associated images to client devices 108a-108e. In some implementations, client devices 108a-e process the images provided from image database 102 through the server 104 to generate the animation. In some implementations, certain computations may be performed on server 104, and the processed image information served to client devices 108.

Each of client devices 108a-108e can represent various forms of processing devices. Example processing devices can include a desktop computer, a laptop computer, a handheld computer, a television with one or more processors attached or coupled thereto, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
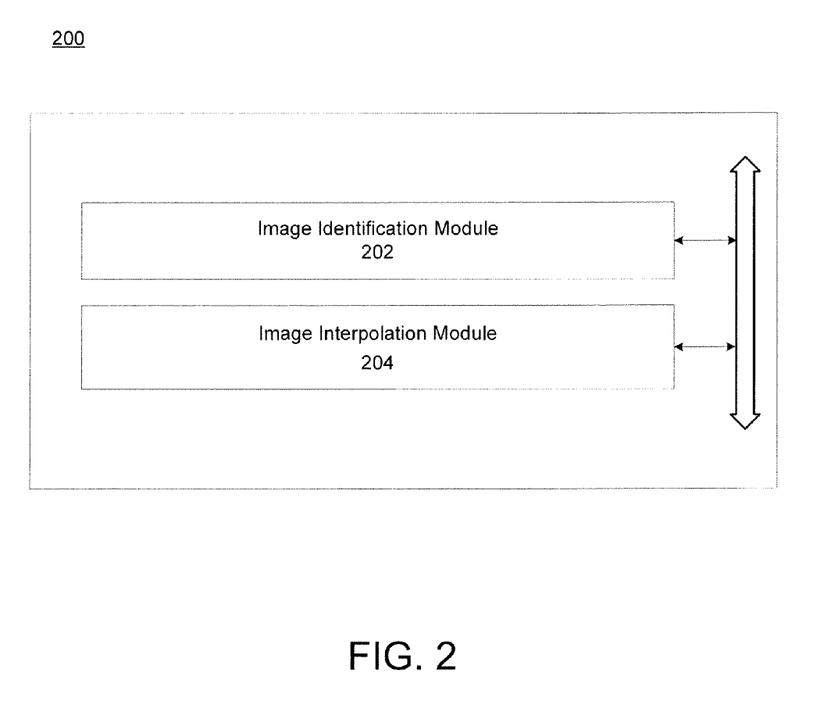
FIG. 2 illustrates an example of a system for generating images used in animating the transition between different viewing orientations, in accordance with various aspects of the subject technology.

FIG. 2 illustrates an example of a system utilized for generating the animation, in accordance with various aspects of the subject technology. System 200 includes image identification module 202 and image interpolation module 204. These modules, which are in communication with one another, interpolate images retrieved from image database 102 in order to render the images necessary for producing an animation representative of a progression of camera poses along a navigational path. In some aspects, the modules may be implemented in software (e.g., subroutines and code). The software implementation of the modules may operate on a web browser that generates interactive 3D graphics (e.g., by using Web-based Graphics Library, Cascading Style Sheets animation, etc.) running on a client device. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
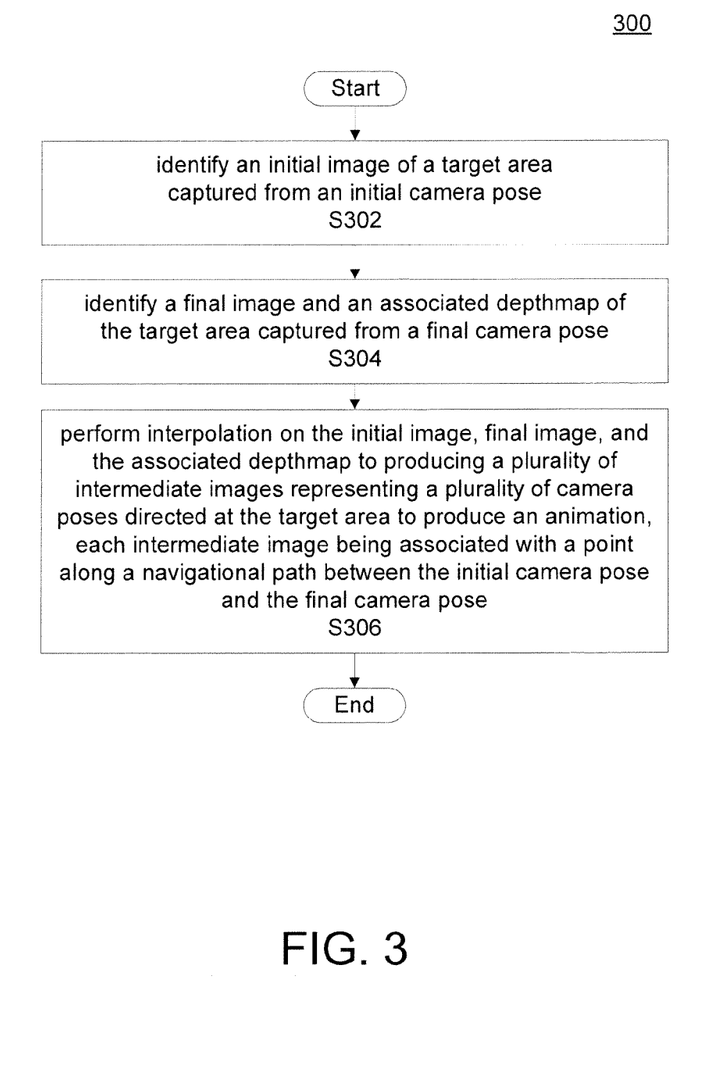
FIG. 3 illustrates an example of a method for generating an animation of a transition between different viewing orientations, in accordance with various aspects of the subject technology.
Figure 4:
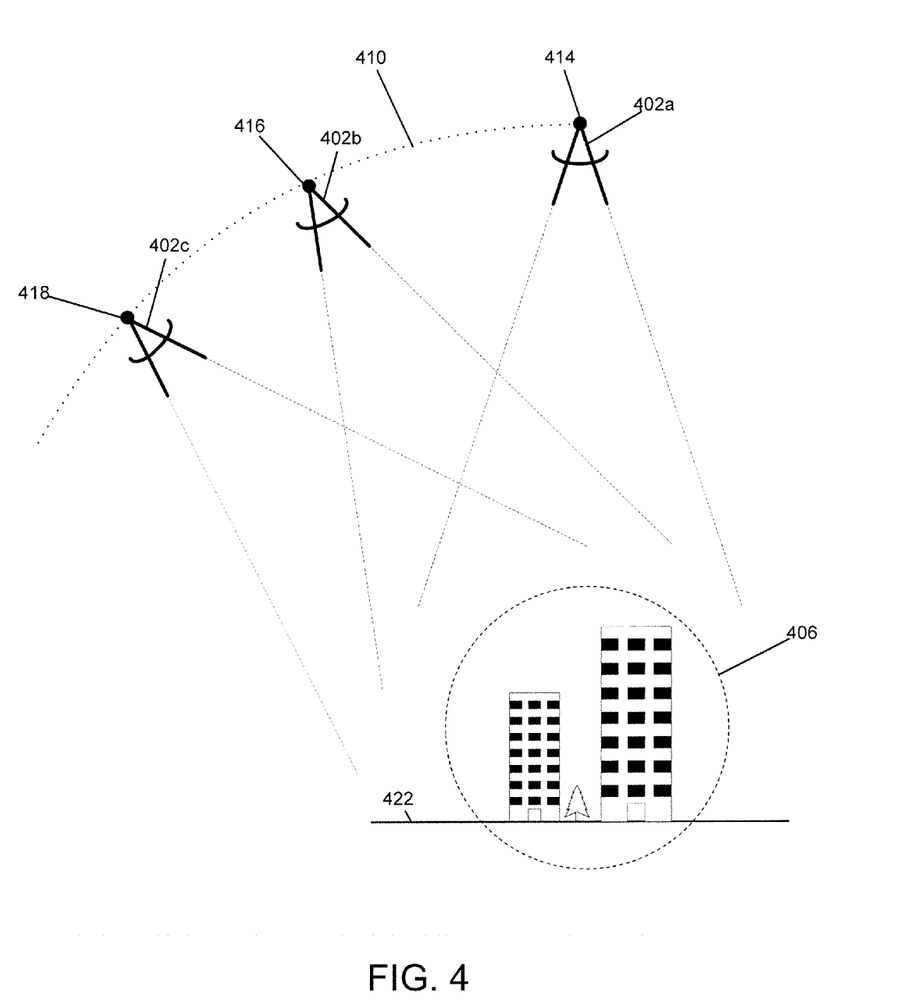
FIG. 4 provides a graphical representation of camera poses for which an animation is generated, in accordance with various aspects of the subject technology.

FIG. 3 illustrates an example of method 300 for generating an animation representative of a progression of camera poses along a navigational path, in accordance with various aspects of the subject technology. FIG. 4 provides a graphical representation of camera poses 402a-402c for which the animation may be generated. While FIG. 4 illustrates an example that includes three camera poses, numerous additional camera poses along the navigational path may be represented in the animation. Camera poses 402a-402c are illustrated as progressing along navigational path 410 from a nadir position (e.g., at position 414) to an oblique aerial position (e.g., at position 418) while maintaining a view of target area 406, in accordance with various aspects of the subject technology. Target area 406 may be a point of interest in a mapping application. For example, target area 406 may include a 3D landmark that a user may not be able to discern from nadir position 414. However, the user may enter a user command to prompt the mapping application transition from the nadir view at position 414 to the oblique aerial position at position 418, in order to better appreciate the 3D characteristics of the landmark. Method 300 may be used to produce a plurality of orthographic approximation images representing a plurality of camera poses (e.g., 402a-402c) between nadir position 414 and oblique aerial position 418 to generate images representing transitions in the viewing angles, as described in further detail by reference to FIG. 6.

Figure 5A:
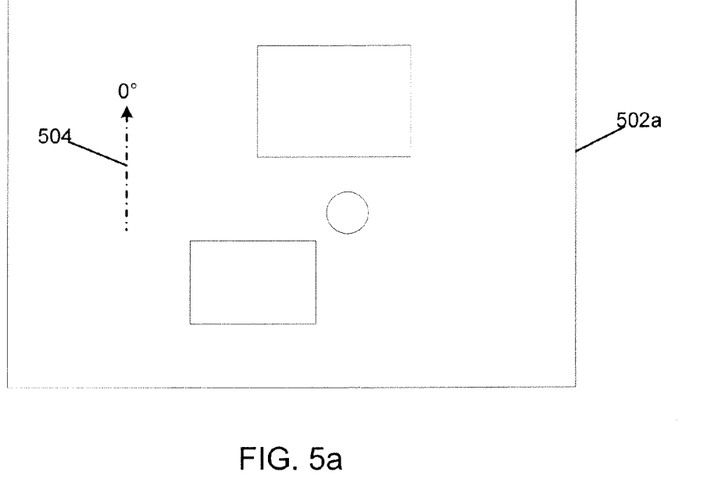
FIGS. 5a-5c illustrate example images of a target area corresponding to multiple camera poses along a navigational path, in accordance with various aspects of the subject technology.
Figure 5B:
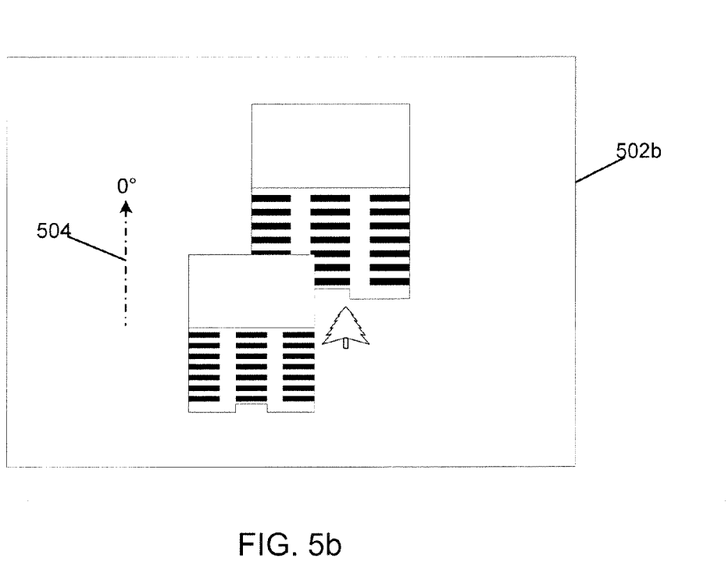
Figure 5C:
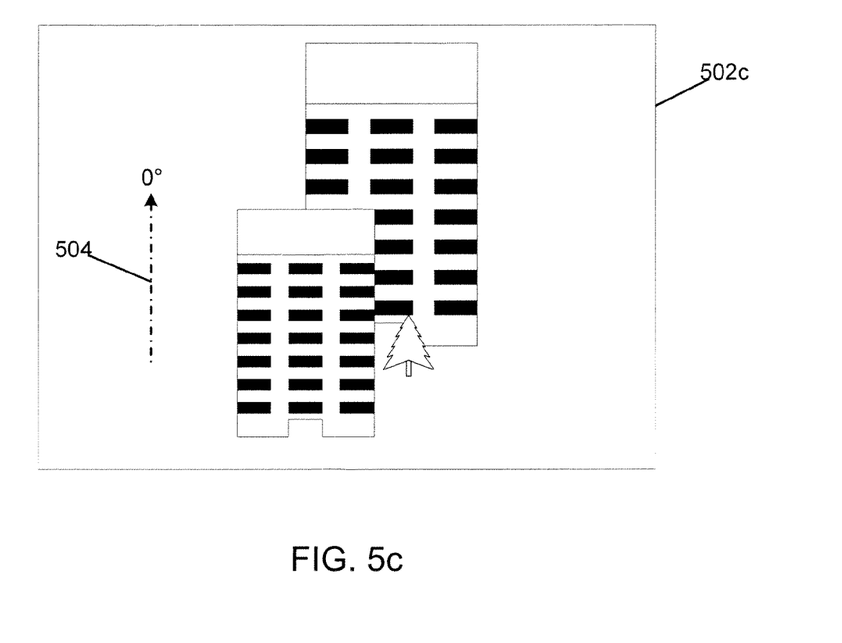

Returning to FIGS. 2 and 3, image identification module 202 may, upon receiving a user command to transition from an initial nadir view of a target area to a final oblique aerial view of the target area, identify the initial image of target area 406 corresponding to an initial camera pose, according to S302. FIGS. 5a-5c illustrate example images of target area 406 at various stages of the animation. The example images correspond to camera poses 402a-402c and depict a progression along navigational path 410, in accordance with various aspects of the subject technology. While FIG. 5 provides only three example images of the animation, numerous additional images may be rendered to improve the quality of the animation.

As shown in FIGS. 4 and 5a, initial image 502a represents an image corresponding to camera pose 402a at nadir position 414. That is, initial image 502a of target area 406 represents camera pose 402a at the initial camera pose. Initial image 502a also represents an initial orientation corresponding to camera pose 402a. The initial orientation may comprise at least one of an initial tilt angle of the image and an initial heading of the image. For example, as shown in FIG. 4, initial image 502a in the initial camera pose 402a is at position 414. In this initial camera pose 402a (e.g., the nadir position), the tilt is 0° with respect to a normal to surface 422 of the Earth. Thus, the initial camera pose provides an overhead view of surface 422, including a top view of target area 406. A heading of the initial camera pose may be determined based on the heading of the final camera pose. For example, the heading of the initial image may be determined to be the same as that of the final camera pose in order to provide a single heading along which the navigational path of the animation proceeds.

Image identification module 202 may also identify a final image and a depthmap associated with the final image of target area 406 corresponding to a final camera pose, according to S304. As shown in FIGS. 4 and 5c, final image 502c represents an image corresponding to camera pose 402c at oblique aerial position 418. That is, final image 502c of target area 406 represents camera pose 402c at the final camera pose. Final image 502c also represents a final orientation corresponding to camera pose 402c. The final orientation may comprise at least one of a final tilt angle of the image and a final heading of the image. For example, a final image in the final camera pose at position 418 is shown in FIG. 4. In this final camera pose (e.g., the oblique aerial position), the tilt is at 45° with respect to the normal to surface 422 of the Earth. Thus, the final camera pose may provide an oblique aerial view of surface 422, including an elevated angled view of target area 406. The final image may also include heading 504.

FIG. 5 shows final image 502c as an oblique aerial view with a heading of 0° North. Heading 504 of the final image may be used to determine the heading at which the navigational path of the animation proceeds. For example, FIGS. 5a-5c indicate that the navigational path of the animation proceeds at heading 0° from the initial image 502a to final image 502c. In some implementations, a variety of other headings may be used.

According to certain aspects, a plurality of intermediate orthographic approximation images representing a plurality of intermediate camera poses directed at the target area may be produced by performing interpolations. Each of the intermediate images represents a pose between the initial camera pose and the final camera pose. According to S306, image interpolation module 204 may produce a plurality of intermediate images that represents camera poses (e.g., 402a-402c) progressing along navigational path 410 between the initial camera pose and the final camera pose. Each of the plurality of intermediate images may comprise at least one of an intermediate position (e.g., positions 416 in FIG. 4) and an intermediate orientation.

In some aspects, intermediate image 502b represents an intermediate orientation of camera pose 402b. The intermediate orientation may comprise at least one of an intermediate tilt angle of the image and an intermediate heading of the image. For example, intermediate image 502b may be rendered for the intermediate camera pose at position 416 shown in FIG. 4. The tilt for intermediate camera poses is between the tilt of the initial image (i.e., 0° with respect to a normal to surface 422 of the Earth) and the final image (i.e., 45° with respect to a normal to surface 422 of the Earth). Thus, each intermediate camera image provides an oblique aerial view of target area 406 at a lower elevation than the initial image but at a higher elevation than the final image. The intermediate camera pose includes a corresponding heading 504. In intermediate image 502b, the intermediate oblique aerial view is shown to be at heading 0° North. That is, the intermediate image is rendered to be at heading 504. In FIGS. 5a-5c, heading 504 of the initial image 502a and intermediate image 502b corresponds to the heading of the final image 502c such that the navigational path of the animation maintains the same heading throughout the progression. For example, FIGS. 5a-5c indicate that the navigational path of the animation proceeds at heading 0° from the initial image 502a to final image 502c. While FIG. 5 provides only three example images of the animation, additional images may be rendered to generate a better quality animation. In some implementations, the intermediate images may be rendered such that the intermediate images may have headings different from the final image.

Figure 6:
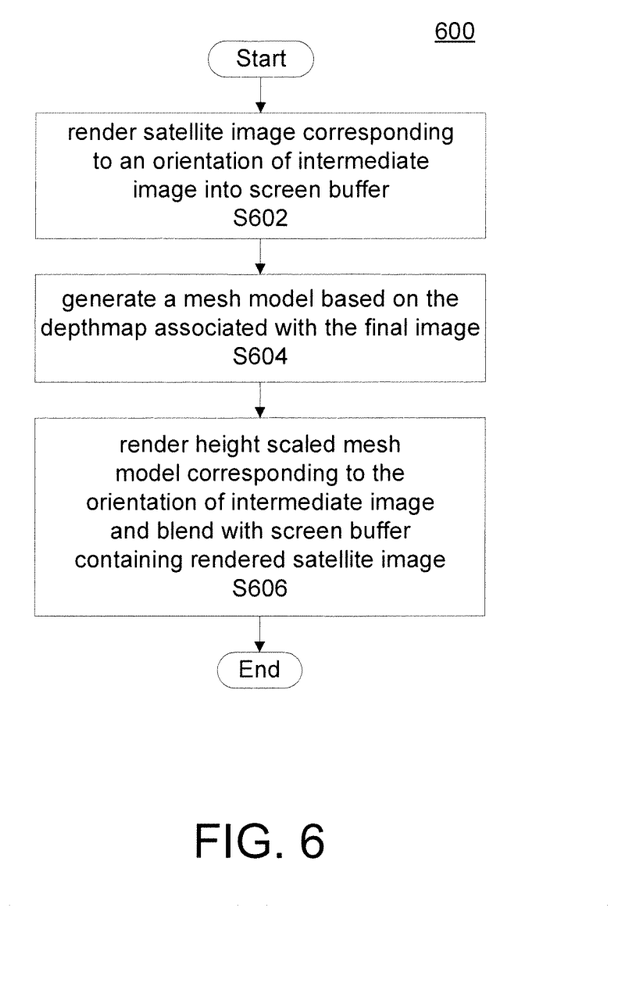
FIG. 6 illustrates an example of a method for performing an interpolation to produce images used in animating the transition between different views.

FIG. 6 illustrates an example of method 600 for producing each of the plurality of intermediate orthographic approximation images that provide a view of a transition from the nadir position to the oblique aerial position, in accordance with various aspects of the subject technology. Each of the plurality of intermediate images correspond to a camera pose may be rendered such that each subsequent one of the plurality of intermediate images provides an image that more closely represents final image 512c than does a previous one of the plurality of intermediate images. As shown in FIG. 5, the intermediate camera pose after the initial camera pose may be rendered such that intermediate image 512b is closer to final image 512c than is initial image 512a. Similarly, additional subsequent intermediate camera poses may be rendered such that each subsequent intermediate image is closer to final image 512c than is the previous intermediate image.

A satellite image corresponding to the orientation of the intermediate image may be rendered into a screen buffer, according to S602. The satellite image may be stretched from its original aspect ratio and may also be scaled according a zoom action described in further details below. The depthmap associated with the final image provides depth information of the target area 406. The depthmap may be used by image interpolation module 204 to generate a 3D mesh model of the target area, according to S604. The mesh model is scaled to a height corresponding to the orientation of intermediate image and rendered into and blended with the screen buffer containing the rendered satellite image, according to S606

Since the height of structures in the target area 406 becomes more apparent when the camera pose of the rendered image approaches the camera pose of the final image, the image interpolation module 204 may scale the mesh model accordingly. The height to which the mesh model is scaled by the image interpolation module 204 corresponds to a viewing angle of the rendered camera pose. For example, when the viewing angle approaches that of the nadir view (e.g., view from 0°), the height of the mesh model is scaled to approach zero. That is, structures in target area 406 viewed from the nadir view appear to be flat. However, as the viewing angle approaches that of the oblique aerial view (e.g., view from 45°), the height of the mesh model is scaled to approach the actual height of the structures in target area 406 depicted in the final image because structures viewed from an oblique aerial angle provide a perspective from which height may be ascertained.

For each intermediate image, the rendered scaled mesh model is blended into the screen buffer containing the rendered satellite image, according to S606. In some implementations, the rendered satellite image may be at a first opacity and the rendered mesh model may be at a second opacity when the blending is performed. The first opacity and the second opacity may be determined based on the orientation of the intermediate image. The closer the orientation of the intermediate image is to the initial image, the higher the first opacity will be set, and the lower the second opacity will be set. Conversely, the closer the orientation of the intermediate image is to the final image, the lower the first opacity will be set, and the higher the second opacity will be set. In other words, the image interpolation module 204 will favor the information from the initial image over the final image when the orientation of the intermediate image represents a camera pose closer to the initial camera pose, and the image interpolation module 204 will favor the information from the final image over the initial image when the orientation of the intermediate image represents a camera pose closer to the final camera pose. Accordingly, as the animation of camera 402 progresses along navigational path 410 from the initial camera pose to the final camera pose, the first and second opacities are crossfaded with one another (e.g., the first opacity will transition from 100% to 0% and the second opacity will transition from 0% to 100% as the animation progresses from the initial camera pose to the final camera pose). In some aspects, the crossfade of the first and second opacities may be linear with respect to the progression of the animation along the navigational path; however, in other aspects, the crossfade of opacities may be set to be non-linear.

In some aspects, the animated transition from the nadir view to the oblique aerial view may be performed concurrently with a zoom action. That is, the scaling of the mesh model may be performed while a zoom level is changed. For example, during the animation, the viewing angle may change from an initial angle to a final angle while the image is zoomed from an initial zoom to a final zoom. In some implementations, the zoom may be performed during any portion of the transition of viewing angles. In some implementations, the zoom may be performed throughout the entire transition of viewing angles.

In addition to the foregoing descriptions, the plurality of intermediate images may be rendered such that the intermediate images are aligned along a same heading 504 between initial image 512*a* and final image 512*c*. Furthermore, the plurality of intermediate images may be rendered such that each of the plurality of intermediate images remains centered around an initial point of target area 406. In some aspects, the initial point may be determined to be at a location of a cursor on the mapping application at the onset of the transition from the nadir view to the oblique aerial view. For example, if the transition between views is initiated when the cursor is positioned over a landmark of the map in the initial view, the final view of the transition may be positioned such that the landmark is in the same position with relation to the cursor.

In some aspects, the rate at which the animation is rendered may be optimized to enhance the user's experience. In certain instances, rendering the animation too quickly (i.e., transitioning over a short timeframe) may result in an abrupt and unpleasant user experience. On the other hand, rendering the animation too slowly (i.e., transition over a long timeframe) may be time consuming and may delay the user from viewing target area 406 from the oblique aerial view. According to certain aspects, the rendering of the animation may be controlled by a predefined timing function. For example, an ease-in/ease-out timing function (e.g., Bezier timing function) may accelerate the progress along the navigational path through the middle of the transition. That is, the timing function may cause images generated during the beginning and end portions of the timeframe of the transition to represent slower progress along the navigational path than images generated during the middle of the timeframe. In some aspects, a timing function may be used to accelerate the rate of progression along the navigational path in areas where the transition is likely to produce artifacts from the rendering (e.g., at the middle section of the navigational path). Other timing functions, including linear timing curves and other non-linear timing functions, may be used to further enhance the user experience with transitions between the initial camera pose and the final camera pose.

In some aspects, the timing function may be assigned a fixed duration (e.g., 300 milliseconds) over which the transition is performed. The number of frames rendered during this fixed duration may depend on the graphical processing speed of client device 108. For example, if client device 108 has the capability of rendering 30 frames per second, then 10 frames is produced over the transition of 300 milliseconds. If client device 108 renders less than 30 frames per second, then fewer frames are produced over the duration of the transition. Conversely, if client device 108 can render more than 30 frames per second, then more frames may be produced over the duration of the transition. The timing function may provide information that indicates which orientation of the intermediate image to generate at a given point of the timeframe.

In some implementations, the method described above may be performed in reverse to produce a transition from an oblique aerial view to a nadir view in a mapping application. For example, the initial image from which the transition is rendered may be the oblique aerial image while the final image to which the transition is rendered may be the nadir view image. The rendering process described above may be similarly applied to produce the transition from the oblique aerial view to the nadir view.

In some implementations, height maps may be used to generate the mesh model. Height maps may be heading independent and thus may be used for oblique view images of all headings as well as nadir view images. In some implementations, a raw 3D mesh model may be streamed from server 104 to client devices 108, from which the intermediate images may be rendered. In some implementations, depthmaps associated with nadir view images may also be provided and used to render the intermediate images. The nadir view image depthmaps may provide additional information from which the intermediate images may be rendered.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 7:
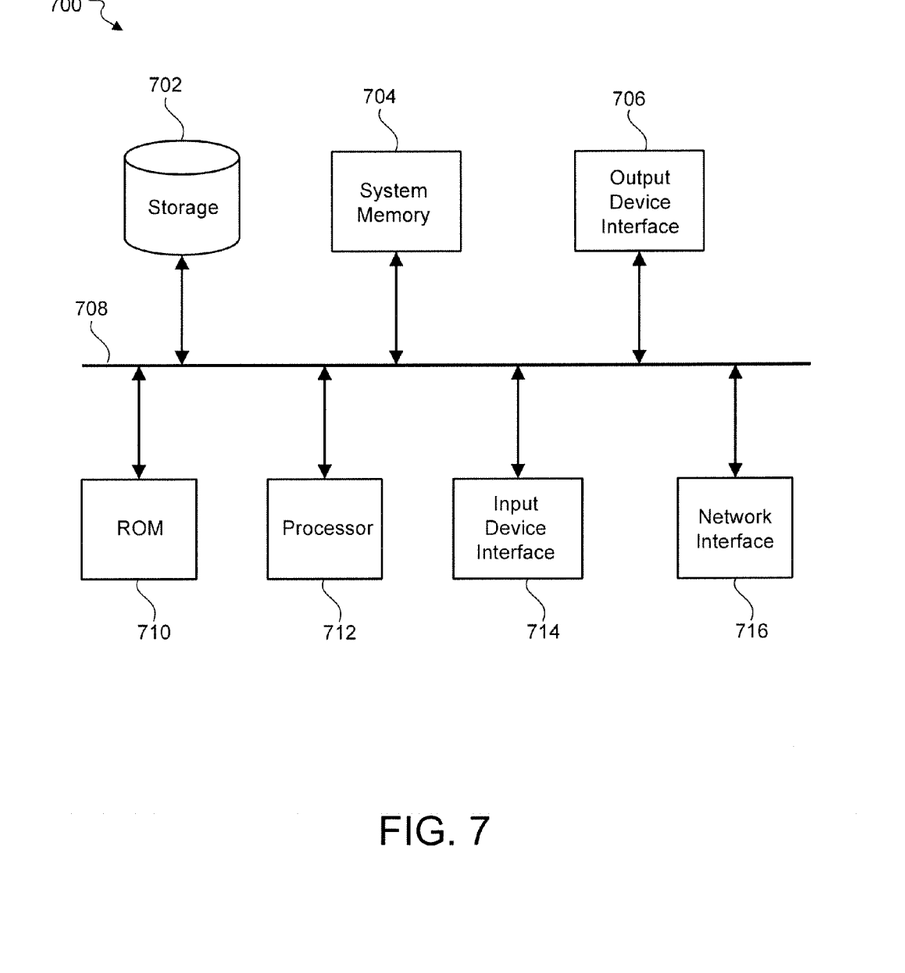
FIG. 7 is a block diagram that illustrates components of a computing device, in accordance with various aspects of the subject disclosure.

FIG. 7 conceptually illustrates an example electronic system with which some implementations of the subject technology are implemented. Electronic system 700 can be a computer, phone, PDA, or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for rendering a sequence of orthographic approximation images corresponding to camera poses to generate animation in mapping applications in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interface 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Finally, as shown in FIG. 7, bus 708 also couples electronic system 700 to a network (not shown) through a network interface 716. In this manner, the computer can be a part of a network of computers, such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A machine-implemented method of rendering a sequence of orthographic approximation images corresponding to camera poses to generate an animation moving between an initial view and a final view of a target area, the method comprising:
   identifying, with one or more processors, an initial image of the target area, the initial image corresponding to an initial camera pose directed at the target area;
   identifying, with the one or more processors, a final image and an associated depthmap of the target area, the final image and the associated depthmap corresponding to a final camera pose directed at the target area, wherein the initial camera pose is different from the final camera pose; and
   performing, with the one or more processors, interpolation on the initial image, the final image, and the associated depthmap in order to produce a plurality of intermediate images corresponding to a plurality of camera poses directed at the target area, each intermediate image being associated with a point along a navigational path between the initial camera pose and the final camera pose, wherein an animation of the plurality of intermediate images produces a transition of views between the initial camera pose and the final camera pose, the interpolation comprising:
      rendering a height scaled mesh model based on the final image and the depthmap associated with the final image for each of the plurality of intermediate images, wherein each of the plurality of intermediate images corresponds to an intermediate camera pose of a specific angle; and
      processing the plurality of height scaled mesh models based on the initial image, the processing comprising blending the initial image at a first opacity with the final image at a second opacity, wherein the first and second opacities are determined based on the specific angle of the corresponding camera pose.

2. The machine-implemented method of claim 1, wherein the identified initial image is a nadir view image representing a view perpendicular to a surface plane of the target area.

3. The machine-implemented method of claim 1, wherein the identified final image is an oblique view image representing a view at an angle to the surface plane of the target area greater than 0° and less than 90°.

4. The method of claim 3, wherein the oblique view represents a view at a 45° angle to the surface plane of the target area.

5. The machine-implemented method of claim 1, wherein the depthmap associated with the final image comprises a plurality of pixels, and wherein each pixel of the depthmap comprises a depth value.

6. The machine-implemented method of claim 1, wherein the animation comprises providing for display each of the plurality of intermediate images in an order according to a progression of angles of the plurality of intermediate images.

7. The machine-implemented method of claim 6, wherein the progression of angles progresses from an angle associated with the initial image to an angle associated with the final image.

8. The machine-implemented method of claim 6, wherein the progression of angles progresses from an angle associated with the final image to an angle associated with the initial image.

9. The machine-implemented method of claim 1, further comprising applying a timing function to control the production of each of the plurality of intermediate images by determining a corresponding camera pose angle for each intermediate image produced.

10. A non-transitory machine-readable medium comprising instructions stored therein, which when executed by a system, cause the system to perform operations comprising:
    receiving a satellite view image as an initial camera pose of a target area;
    rendering the satellite view image into a screen buffer;
    receiving a oblique view image as a final camera pose of the target area;
    receiving a depthmap associated with the oblique view, wherein the depthmap comprises a plurality of pixels, each pixel comprising a depth value; and
    performing interpolation on the satellite view image, the oblique view image, and the depthmap associated with the oblique view in order to produce a plurality of intermediate images corresponding to a plurality of intermediate camera poses of the target area by:
       rendering a height scaled mesh model based on the oblique view image and the depthmap associated with the oblique view image for each of the plurality of intermediate images, wherein each of the plurality of intermediate images corresponds to an intermediate camera pose of a specific angle; and
       processing the plurality of height scaled mesh models based on the satellite image rendered into the screen buffer, the processing comprising blending the satellite view image at a first opacity with the oblique view image at a second opacity, wherein the first and second opacities are determined based on the specific angle of the corresponding camera pose.

11. The non-transitory machine-readable medium of claim 10, wherein the received satellite image corresponds to a nadir view image representing a view perpendicular to a surface plane of the target area.

12. The non-transitory machine-readable medium of claim 10, wherein the received oblique view image represents a view at a 45° angle to a surface plane of the target area.

13. The non-transitory machine-readable medium of claim 10, wherein each of the plurality of camera poses is associated with a point along a navigational path between an initial camera pose corresponding to the received satellite view image and a final camera pose corresponding to the received oblique view image.

14. The non-transitory machine-readable medium of claim 13, wherein an animation of the plurality of camera poses produces a transition of views between the initial camera pose and the final camera pose.

15. The non-transitory machine-readable medium of claim 13, wherein an animation of the plurality of camera poses produces a transition of views between the final camera pose and the initial camera pose.

16. The non-transitory machine-readable medium of claim 10, further comprising applying a timing function to control the production of each of the plurality of intermediate images by determining a corresponding camera pose angle for each intermediate image produced.

17. A system for generating a sequence of orthographic approximation images corresponding to camera poses to generate an animation moving between a satellite view image and an oblique view image of a target area, the system comprising:
   one or more processors; and
   a machine-readable medium comprising instructions stored therein, which when executed by the one or more processors, cause the one or more processors to perform operations comprising:
      receiving a satellite view image of the target area, the satellite view image corresponding to an initial camera pose directed at the target area;
      receiving an oblique view image and an associated depthmap of the target area, the oblique view image and the associated depthmap corresponding to a final camera pose directed at the target area, wherein the initial camera pose is different from the final camera pose;
      performing interpolation on the satellite view image, the oblique view image, and the associated depthmap in order to produce a plurality of intermediate images corresponding to a plurality of intermediate camera poses directed at the target area based on the satellite view image, the oblique view image, and the depthmap associated with the oblique view image, each of the plurality of camera poses representing a viewing angle along a navigational path between a viewing angle associated with the initial camera pose and a viewing angle associated with the final camera pose, wherein an animation of the plurality of intermediate images produces a transition of views between the initial camera pose and the final camera pose, wherein producing the plurality of intermediate images comprises:
generating a plurality of height scaled mesh models based on the depthmap associated with the oblique view image, each of the plurality of height scaled mesh models corresponding to one of the plurality of intermediate camera poses; and
blending the satellite view image at a first opacity with the oblique view image at a second opacity, wherein the first and second opacities are determined based on the specific angle of a corresponding camera pose.

18. The system of claim 17, wherein the depthmap associated with the oblique view image comprises a plurality of pixels, and wherein each pixel of the depthmap comprises a depth value.

* * * * *